(12) United States Patent
Venkataramana

(10) Patent No.: US 10,324,465 B1
(45) Date of Patent: Jun. 18, 2019

(54) INTELLIGENT GUIDANCE, NAVIGATION AND CONTROL SYSTEM

(71) Applicant: HONEYWELL INTERNATIONAL INC., Morris Plains, NJ (US)

(72) Inventor: Kiran Mancheiah Venkataramana, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 10 days.

(21) Appl. No.: 15/823,683

(22) Filed: Nov. 28, 2017

(51) Int. Cl.
*G05D 1/00* (2006.01)
*B64C 19/00* (2006.01)
*G05D 1/10* (2006.01)

(52) U.S. Cl.
CPC .......... *G05D 1/0077* (2013.01); *B64C 19/00* (2013.01); *G05D 1/101* (2013.01)

(58) Field of Classification Search
USPC ........................................................... 701/11
See application file for complete search history.

(56) References Cited

U.S. PATENT DOCUMENTS

| 3,665,809 A | | 5/1972 | Walker et al. | |
| 4,472,806 A | * | 9/1984 | Blair .................. | G05B 9/03 714/820 |
| 4,644,538 A | * | 2/1987 | Cooper ................ | G05D 1/0077 700/79 |

(Continued)

FOREIGN PATENT DOCUMENTS

EP 1980924 A1 10/2008

*Primary Examiner* — Tyler D Paige
(74) *Attorney, Agent, or Firm* — Lorenz & Kopf, LLP

(57) ABSTRACT

Systems and computer-implemented methods for executing a command in an autonomous vehicle are provided, including the steps of: generating at least three independent vehicle data-sets; transmitting the at least three independent vehicle data-sets to at least three command determination modules, respectively; and, at each one of the at least three command determination modules, using the respective received vehicle data-set to determine a command. The method further includes the step of, during a monitoring phase, comparing the commands to each other to determine if any one of these commands is desynchronized from the other commands. If a command is determined to be desynchronized from the other commands during the monitoring phase, the method includes the step of excluding the command determination module which determined the desynchronized command. The method further includes the step of, during a substantiation phase, comparing commands determined by non-excluded command determination modules to each other to determine if any one of these commands is desynchronized from the other commands. If a command is determined to be desynchronized from the other commands in the substantiation phase, the method includes the step of excluding the previously non-excluded command determination module which determined the desynchronized command. After the monitoring and substantiation phases are completed, the method includes the step of selecting a command determined by a non-excluded command determination module; and executing the selected command.

20 Claims, 7 Drawing Sheets

(56) References Cited

U.S. PATENT DOCUMENTS

| | | | |
|---|---|---|---|
| 5,297,052 A | 3/1994 | McIntyre et al. | |
| 5,515,282 A | 5/1996 | Jackson | |
| 6,273,771 B1* | 8/2001 | Buckley | B63H 21/213 114/144 RE |
| 7,283,934 B2* | 10/2007 | Deller | F15B 19/005 702/183 |
| 7,801,702 B2* | 9/2010 | Berbaum | G06F 11/27 701/31.4 |
| 8,942,882 B2* | 1/2015 | Swearingen | G08G 5/0021 701/29.1 |
| 9,092,313 B2 | 7/2015 | Nelson et al. | |
| 2003/0080256 A1* | 5/2003 | Urnes, Sr. | G05D 1/0055 244/194 |
| 2005/0114023 A1* | 5/2005 | Williamson | G01C 21/165 701/472 |
| 2005/0114090 A1* | 5/2005 | Black | G05B 23/0294 702/188 |
| 2008/0040152 A1* | 2/2008 | Vian | G05B 23/0221 705/2 |
| 2010/0121575 A1* | 5/2010 | Aldridge | G08G 5/0069 701/301 |
| 2015/0369626 A1* | 12/2015 | Dabrowski | G01C 23/00 701/14 |
| 2017/0015405 A1* | 1/2017 | Chau | B64C 13/06 |
| 2018/0164825 A1* | 6/2018 | Matus | B60W 50/0098 |

* cited by examiner

INTELLIGENT GUIDANCE, NAVIGATION AND CONTROL SYSTEM

TECHNICAL FIELD

The present disclosure generally relates to guidance, navigation and control systems, and more particularly relates to guidance, navigation and control systems for autonomous vehicles, such as autonomous aircraft.

BACKGROUND

This section provides background information related to the present disclosure which is not necessarily prior art.

Aircraft autopilot systems are known. Conventional aircraft autopilot systems may include GNC systems (guidance, navigation and control systems), which automatically control aircraft surfaces on the basis of processed data about the aircraft and its surrounding environment. This data may include acceleration data, altitude data and so on. GNC systems typically operate with little or no user input.

Conventional GNC systems normally determine the aircraft's desired trajectory and velocity on the basis of the processed data. Conventional GNC systems also normally determine the manner of control of aircraft surfaces and propulsion systems to best implement the desired trajectory and velocity whilst maintaining aircraft stability.

Though highly unlikely, it is postulated that GNC systems may be subject to faults. It is therefore desirable to improve the tolerance to postulated faults of systems which utilize GNC systems. The provided disclosure and embodiments addresses this need as well as other design considerations.

BRIEF SUMMARY

This summary is provided to introduce a selection of concepts in a simplified form that are further described below in the detailed description section. This summary is not intended to identify key features or essential features of the claimed subject matter, nor is it intended to be used as an aid in determining the scope of the claimed subject matter.

Systems and methods are provided for executing a command in an autonomous vehicle. In one embodiment, a computer-implemented method for executing a command in an autonomous vehicle is provided. The method includes the steps of: generating at least three independent vehicle data-sets; transmitting the at least three independent vehicle data-sets to at least three command determination modules, respectively; and, at each one of the at least three command determination modules, using a respective received vehicle data-set to determine a command. The method further includes the step of, during a monitoring phase, comparing the commands to each other to determine if any one of these commands is desynchronized from the other commands. If a command is determined to be desynchronized from the other commands during the monitoring phase, the method includes the step of excluding the command determination module which determined the desynchronized command. The method further includes the step of, during a substantiation phase, comparing commands determined by non-excluded command determination modules to each other to determine if any one of these commands is desynchronized from the other commands. If a command is determined to be desynchronized from the other commands in the substantiation phase, the method includes the step of excluding the previously non-excluded command determination module which determined the desynchronized command. After the monitoring and substantiation phases are completed, the method includes the step of selecting a command determined by a non-excluded command determination module, and then executing the selected command.

In an embodiment, there is provided a system for controlling an autonomous vehicle. The system includes at least three independent sensor sets for generating at least three independent vehicle data-sets. The system also includes at least three command determination modules, wherein each one of the at least three command determination modules is configured to receive one of the at least three independent vehicle data-sets from the at least three independent sensor sets, respectively, and each one of the at least three command determination modules is configured to determine a command on the basis of the respective received independent vehicle data-set. Each one of the at least three command determination modules comprises an obstacle detection module configured to detect an obstacle on the basis of the received vehicle data-set. The system also includes a monitoring module configured to compare the commands determined by the at least three command determination modules to each other during a monitoring phase, prior to the detection of an obstacle by one of the obstacle detection modules, and to determine if any one of these commands is desynchronized from the other commands. If the monitoring module determines that a command is desynchronized from the other commands during the monitoring phase, the monitoring module is configured to exclude the command determination module which determined the desynchronized command. The monitoring module is further configured to compare the commands determined by the non-excluded command determination modules to each other during a substantiation phase, subsequent to the detection of an obstacle by one of the obstacle detection modules, to determine if any one of these commands is desynchronized from the other commands. If the monitoring module determines that a command is desynchronized from the other commands during the substantiation phase, the monitoring module is configured to exclude the command determination module used to determine the desynchronized command. The system also includes an autopilot configured to select, after the substantiation phase, a command determined by a non-excluded command determination module and then execute the selected command.

In an embodiment, an autonomous vehicle is provided. The autonomous vehicle includes a control system which includes at least three independent sensor sets for producing at least three independent vehicle data-sets. The control system includes at least three command determination modules, wherein the at least three command determination modules are configured to receive the at least three independent vehicle data-sets from the at least three independent sensor sets, respectively, and each one of the at least three command determination modules is configured to determine a command on the basis of the respective received independent vehicle data-set. Each one of the at least three command determination modules comprises an obstacle detection module configured to detect an obstacle on the basis of the received vehicle data-set. The control system includes a monitoring module, wherein the monitoring module is configured to compare the commands determined by the at least three command determination modules to each other during a monitoring phase, prior to the detection of an obstacle by the obstacle detection module, to determine if any one of these commands is desynchronized from the other commands. If the monitoring module determines that a command is desynchronized from the other commands during the monitoring phase, the monitoring module is configured to exclude the command determination module which determined the desynchronized command. The monitoring module is also configured to compare the commands determined by non-excluded command determination modules to each other during a substantiation phase, subsequent to the detection of an obstacle by the obstacle detection module, to determine if any one of these commands is desynchronized from the other commands. If the monitoring module determines that a command is desynchronized from the other commands during the substantiation phase, the monitoring module is configured to exclude the command determination module which determined the desynchronized command. The control system also includes an autopilot system configured to select, after the substantiation phase, a command determined by a non-excluded command determination module and execute the selected command.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived from the following detailed description taken in conjunction with the accompanying drawings, wherein like reference numerals denote like elements, and wherein.

DETAILED DESCRIPTION

Figure 1:
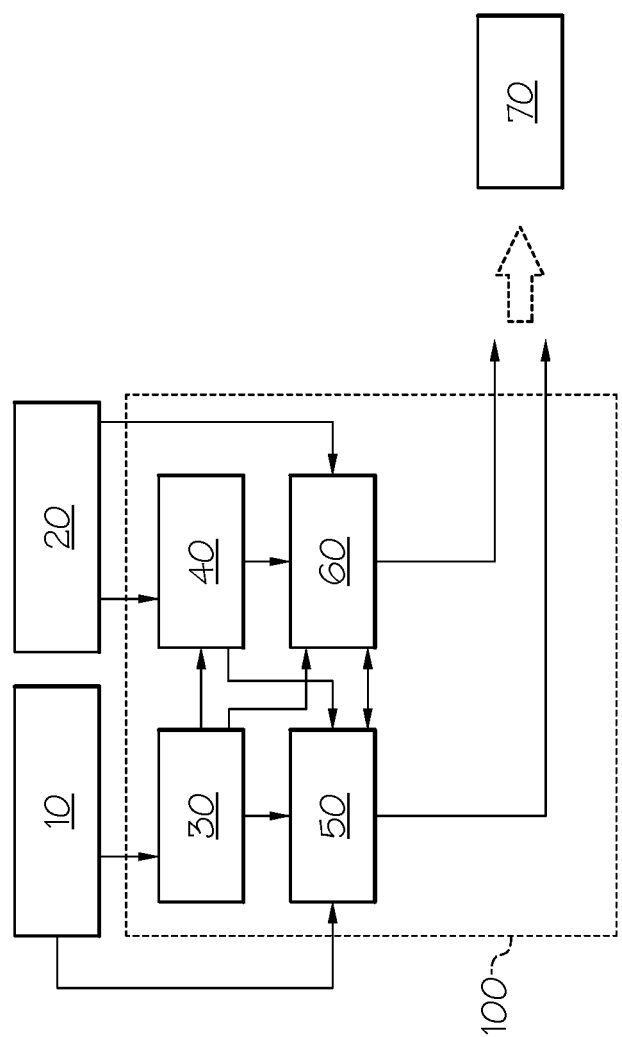
FIG. 1 is a simplified schematic diagram of a command determination module and associated sensors, in accordance with various embodiments.

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the systems and methods defined by the claims. Furthermore, there is no intention to be bound by any expressed or implied theory presented in the preceding Technical Field, Background, Brief Summary or the following Detailed Description.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure. As used herein, the term "module" refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

For the sake of brevity, conventional techniques related to signal processing, data transmission, signaling, control, and other functional aspects of the systems (and the individual operating components of the systems) may not be described in detail herein. Furthermore, any connecting lines shown in the various figures contained herein are intended to represent example functional relationships and/or physical couplings between the various elements. It should be noted that many alternative or additional functional relationships or physical connections may be present in an embodiment of the present disclosure. Although the below exemplary embodiments are described with respect to controlling the vehicle for obstacle-avoidance procedures, it will be appreciated that the same techniques may also be used for other vehicle procedures.

With reference to FIG. 1, an exemplary command determination module is shown at 100. In an embodiment, the command determination module 100 is a guidance, navigation and control (GNC) system. In an embodiment, the command determination module 100 may be associated with an autonomous or semi-autonomous vehicle, such as an autonomously or semi-autonomously controlled aircraft. As will be explained in further detail below, in general, the command determination module 100 receives information from one or more sensors 10, 20 and controls the vehicle based on the received information thereon.

As depicted in FIG. 1, a RADAR system 10 is configured to measure the distance of objects or obstacles surrounding the vehicle using radio pulses. A hybrid GPS and inertial navigation system (GPIRS) 20 obtains measurements related to the position, elevation and speed of the vehicle. On the basis of these measurements, the GPIRS 20 and the RADAR system 10 generate information relating to the vehicle's motion and its surrounding environment. As used herein, the term "vehicle dataset" will be used to refer to the information generated by the GPIRS 20 and the RADAR system 10 relating to the vehicle's motion and its environment.

The vehicle dataset generated by the RADAR system 10 and the GPIRS 20 is transmitted to the command determination module 100. Specifically, the vehicle dataset is transmitted to an obstacle detection module 30 of the command determination module. The obstacle detection module 30 processes the vehicle dataset to detect if an obstacle (for example, another vehicle) is in the environment surrounding the vehicle. If an obstacle is detected, the obstacle detection module 30 also determines the location of that obstacle relative to the vehicle. In an embodiment, if an obstacle is detected, the obstacle detection module also determines the velocity of the obstacle relative to the vehicle.

The command determination module 100 also comprises a path definition module 40. As can be seen in FIG. 1, the vehicle dataset is also transmitted to the path definition module 40. The path definition module 40 is configured to determine how to control the vehicle such that the vehicle can be maintained on its present path. For example, if the GPIRS 20 determines that the vehicle is subject to a strong cross-wind or other such event, the path definition module 40 may determine that a corrective vehicle control action is required to maintain the vehicle on the present path. The path definition module 40 then generates an instruction to perform a corrective vehicle control action and transmits this instruction, together with the vehicle dataset, to a path steering control module 50 and a speed target processor module 60. The path steering control module 50 determines, on the basis of the received instruction and the vehicle dataset, a set of steering commands to implement the received instruction. The speed target processor module 60 determines, on the basis of the received instruction and the vehicle dataset, a set of speed commands to implement the received instruction.

The set of speed commands and the set of steering commands may then be transmitted, via other modules, to an autopilot system 70 for implementation, as will be explained in more detail below. In this manner, the instructions determined by the path definition module 40 may be implemented by commands generated by the path steering control module 50 and the speed target processor module 60.

If an obstacle is detected by the obstacle detection module 30, the path definition module 40 is configured to compare the obstacle location to the planned route of the vehicle. If the obstacle location is co-incident, or close to, the planned route of the vehicle, the path definition module 40 determines that an evasive action must be taken by the vehicle to avoid the obstacle and generates an instruction to this effect.

If the path definition module 40 determines that an evasive action must be taken by the vehicle, the vehicle dataset is passed onto the path steering control module 50 and a speed target processor module 60, together with the information regarding the obstacle location determined by the obstacle detection module 30 and the instruction from the path definition module 40.

The path steering control module 50 then determines, on the basis of this received information, a set of steering commands for controlling the vehicle to avoid the obstacle. The speed target processor module 60 determines, on the basis of this received information, a set of speed commands for controlling the vehicle to avoid the obstacle. Information may be shared between the path steering control module 50 and the speed target processor module 60 during the determination of the set of steering commands and the set of speed commands, as shown in FIG. 1. Furthermore, information may be shared between other modules of the command determination module, as illustrated through the use of the arrows in this figure.

After the determination of the set of steering commands and the set of speed commands by the path steering control module 50 and the speed target processor module 60, respectively, the set of steering and speed commands is then transmitted to the autopilot system 70, via other modules as shall be detailed below. The autopilot then controls the relevant vehicle control systems (such as the vehicle steering system, the vehicle brake system and the vehicle propulsion system, not shown in this figure) according to the determined set of speed and steering commands in order to maneuver the vehicle to avoid the detected obstacle.

A component of the command determination module 100 may become subject to a fault. When the command determination module 100 is subject to a fault, the set of steering and speed commands determined by the path steering control module 50 and the speed target processor module 60 may be sub-optimal. In other words, the set of steering and speed commands determined by the path steering control module 50 and the speed target processor module 60 of the command determination module 100 for maintaining the vehicle on its desired path (when no obstacle is detected) or for performing an evasive maneuver (when an obstacle is detected) may not be accurate.

In order to mitigate against components of a command determination module 100 becoming subject to faults, and to thereby increase the fault-tolerance of the overall autonomous control system, a system in accordance with embodiments of the present invention is provided.

Figure 2:
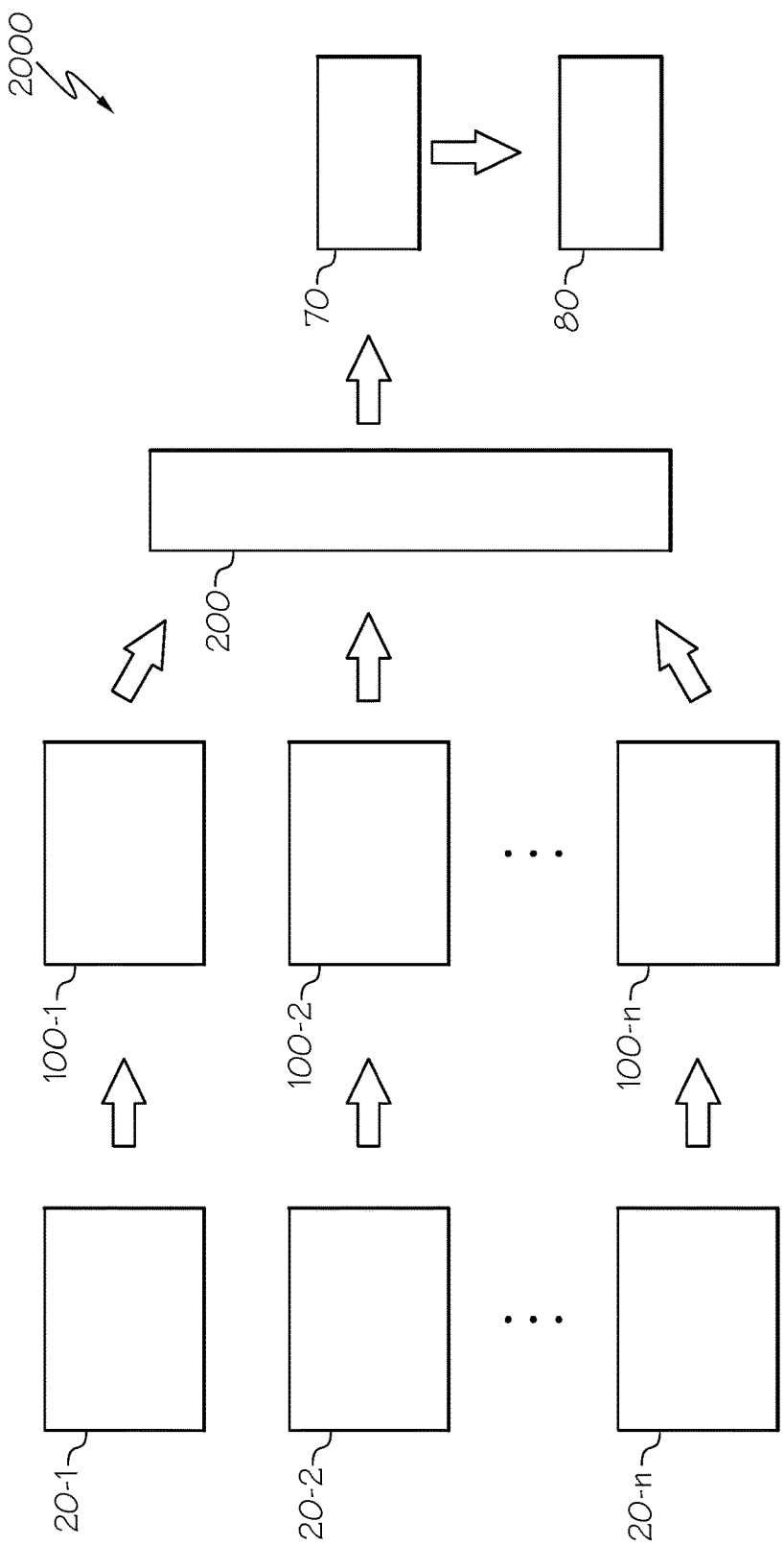
FIG. 2 is a simplified schematic diagram of a monitoring system, in accordance with various exemplary embodiments.

FIG. 2 shows a schematic of a control system 2000 in accordance with embodiments of the present invention. In the control system 2000 of FIG. 2, multiple sensors 20-1, 20-2, 20-n and multiple respective command determination modules 100-1, 100-2, 100-n are provided. Each sensor 20-1, 20-2, 20-n, is configured to provide a vehicle data set to the respective command determination module 100-1, 100-2, 100-n. In an embodiment, the sensors 20-1, 20-2, 20-n comprise GPIRS. In an embodiment, three GPIRS and three respective command determination modules are provided. In other embodiments, five, seven, nine, or more, GPIRS and respective command determination modules are provided. In an embodiment, multiple respective RADAR systems are also included in the sensors 20-1, 20-2, 20-n.

Referring to FIG. 2, each sensor 20-1, 20-2, 20-n performs measurements of the environment surrounding the vehicle and generates a vehicle dataset containing information about the position, elevation and speed of the vehicle, as detailed above. The generated vehicle datasets are then transmitted to a respective command determination module 100-1, 100-2, 100-n. Each respective command determination module 100-1, 100-2, 100-n then determines a set of speed and steering commands on the basis of the vehicle dataset provided by the respective sensor 20-1, 20-2, 20-n.

In a monitoring phase, in which the obstacle detection modules 30 of the command determination modules 100-1, 100-2, 100-n do not detect an obstacle in the environment surrounding the vehicle, each of the sets of speed and steering commands determined by the command determination modules 100-1, 100-2, 100-n are then transmitted to a monitoring module 200. The monitoring module 200 compares each respective set of speed and steering commands to each other to determine whether any of the commands are desynchronized with each other.

As used herein, the term "desynchronized" means a command value determined by a particular command determination module that is different from the command values determined by the other command determination modules by more than a pre-determined amount. Additionally, the term "synchronized command" as used herein means a command value determined by a particular command determination module that is not different from the command values determined by other command determination modules by more than the pre-determined amount.

Referring back to FIG. 2, the monitoring module 200 compares each respective set of determined commands from each command determination module 100 to each other in order to determine whether the commands are synchronized with each other, or whether a particular command from a particular command determination module 100 is desynchronized from the other commands from the other command determination modules 100.

In an embodiment, the monitoring module 200 is configured to use a majority-voting method to determine whether any of the commands are desynchronized from the other commands.

If the value of one of the commands determined from one of the command determination modules differs from the value of the other commands determined by the other command determination modules by more than a pre-determined amount, the command determination module which determined that command is flagged by the monitoring module 200 as excluded. As used herein, the term "excluded" means that the command determination module is suspected as being subject to a fault, and the commands determined by that command determination module are not entered into the comparison performed by the monitoring module 200.

In this manner, command determination modules which are suspected of being faulty may be isolated from the control system 2000. In an embodiment, more than one monitoring module 200 may be included in the control system 2000. In this embodiment, an additional majority voting method is performed on the basis of the determinations of the distinct monitoring modules 200, and any monitoring module that is suspected of being faulty may be isolated.

In an embodiment, in addition to commands from the command determination modules being compared to each other via the majority voting method of the monitoring module 200, all of the commands are also compared to a pre-determined range of acceptable command values by the monitoring module 200. In this embodiment, if any command from a particular command determination module 100 is either voted to be excluded by the majority voting system, or has a value that does not fall within the pre-determined range of acceptable command values, the command determination module which determined that command is excluded by the monitoring module 200.

In an embodiment, any command determination module 100 which is excluded by the monitoring module 200 on the basis of the voting system or on the basis of the pre-determined range of acceptable command limits is then flagged by the monitoring module 200 for reconfiguration. Any command determination modules flagged for reconfiguration may then undergo a reconfiguration process. The reconfiguration process may be a hard reset of the command determination module 100, or may be another form of reconfiguration, such as running a troubleshooting procedure.

After the reconfiguration process is complete, the previously-applied flags are removed from the reconfigured command determination module 100, and the commands determined by the reconfigured command determination module may then be re-introduced into the majority voting method of the monitoring module 200. In this manner, faulty command determination modules may be reconfigured during the monitoring phase "on-the-fly". In an embodiment, commands determined by the reconfigured command determination module are not immediately reintroduced into the majority voting system, but are first checked for consistency with commands determine by non-excluded command determination modules for a period of time before reintroduction. This increases the certainty that the reconfiguration process has properly corrected the fault in the excluded command determination module.

The commands that are not excluded by the voting system (or, in certain embodiments, by comparison to the predetermined range of acceptable command values) are then passed to the autopilot system 70. The autopilot system then selects a non-excluded command, and implements the command via the relevant vehicle control systems.

In an embodiment, one command determination module 100 is designated as a master, and the autopilot 70 always selects the commands determined from the designated master module unless these commands are excluded (i.e., the master module is determined by the monitoring module 200 as faulty).

In an embodiment, if the master command determination module is flagged as faulty, the autopilot 70 may select a set of commands determined by a randomly selected non-excluded command determination module 100. In an alternative embodiment, the command determination modules that are not designated as the master module may be designated as secondary and tertiary modules, and so on. The autopilot 70 may select commands determined by the highest-ordered non-excluded command determination module 100.

As shown in FIG. 2, in an embodiment, the selected commands may be displayed to an occupant of the vehicle on a display 80. In an embodiment, the occupant of the vehicle is the vehicle driver.

If an obstacle is detected by an obstacle detection module 30 of a non-excluded command determination module 100, the monitoring phase ends. In particular, when an obstacle is detected by the obstacle detection module 30 of any of the command determination modules, the obstacle detection module 30 transmits a signal to the path detection module 40 that an obstacle is detected, in the manner as detailed above.

After obstacle detection, the control system 2000 enters into a substantiation phase. In the substantiation phase, each presently non-excluded command determination module 100 determines a set of speed commands and a set of steering commands for performing an obstacle avoidance maneuver.

During the substantiation phase, there is no re-introduction of commands from reconfigured command determination modules into the voting system. Any commands determination modules 100 that have been excluded in the monitoring phase remain excluded for the entirety of the substantiation phase.

In the substantiation phase, the monitoring module 200 compares the commands determined by the non-excluded command determination modules 100 over a relatively shorter time period, such as from around 0.1 seconds to around 30 seconds, for example around 1 to 10 seconds, in particular around 3 seconds. The commands determined by the non-excluded command determination modules are compared to one another over this shorter time period using the majority voting system of the monitoring module 200. In an embodiment, the commands determined by the non-excluded command determination modules are also compared to a predetermined range of acceptable command values.

If any command from a particular non-excluded command determination module 100 is either voted as being desynchronized from the other commands by the majority voting system, or has a value that does not fall within the pre-determined range of acceptable command values, the non-excluded command determination module which determined that command is subsequently excluded by the monitoring module 200. The autopilot then selects a command from a non-excluded command determination module in the same manner as described above for the monitoring phase, and implements the selected command in a navigation phase.

In this manner, commands are compared to each other via the voting system in two different scenarios: in a "normal" scenario in the monitoring phase where no obstacle is detected, and in an "obstacle avoidance" scenario in the substantiation phase. By comparing the commands determined by the multiple command determination modules to each other in two different scenarios, the likelihood of synchronized commands being determined by non-faulty command determination modules is increased. In other words, by ensuring that the synchronized commands remain synchronized across multiple different scenarios, a higher level of confidence is achieved that the command determination modules which determine the synchronized commands are not subject to any faults.

Furthermore, by pre-excluding any commands from faulty command determination modules in the monitoring phase, the majority voting system of the monitoring module has a higher degree of accuracy during the substantiation phase. Still further, the time required to perform the voting system of the monitoring module 200 in the substantiation phase may be decreased by pre-excluding these commands and thereby reducing the total number of commands to be compared.

Still further, by selecting a command to implement instead of interpolating or averaging all of the non-excluded commands, the introduction into the implemented command of small-scale errors, due to the use of interpolation or averaging techniques, is avoided. Such small-scale errors may scale into larger errors when the command is implemented by the autopilot 70.

Figure 3:
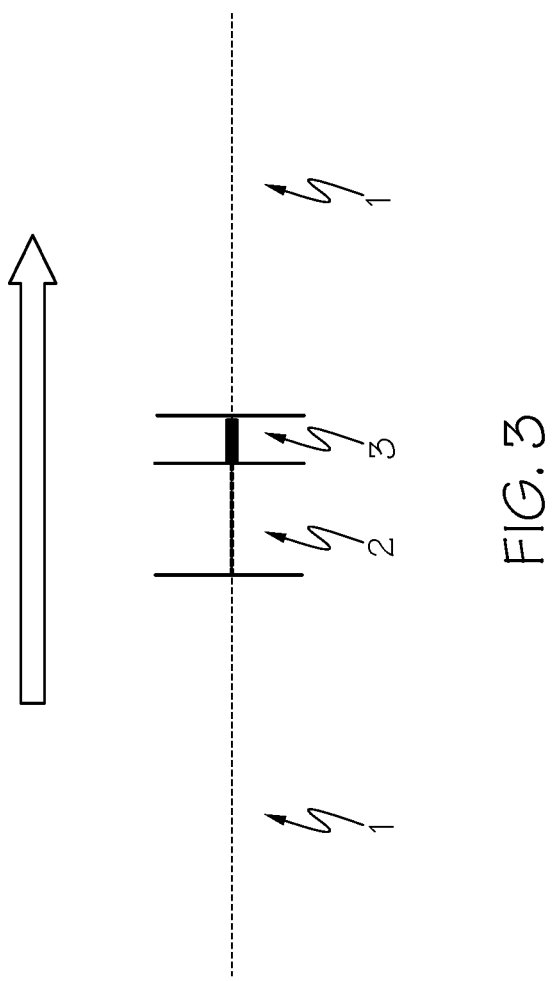
FIG. 3 is a schematic of a timeline showing the monitoring, substantiation and navigation periods.

Referring now to FIG. 3, a schematic timeline (progressing in time from left to right, as shown by the arrow) of the different phases is shown. When no obstacle is detected, the control system 2000 remains in a monitoring phase 1. During the monitoring phase, command determination modules 100 may be excluded by the monitoring module and then reconfigured, as detailed above. Commands from reconfigured command determination modules may be re-introduced into the majority-voting method of the monitoring module 200, as detailed above. The autopilot 70 controls the vehicle according to a selected non-excluded command.

When an obstacle is detected by an obstacle detection module of one of the non-excluded command detection modules 100, the monitoring system enters into a substantiation phase 2. During the substantiation phase, which in one embodiment has a pre-determined time period, commands from non-excluded command determination modules are compared by the monitoring module 200, and certain non-excluded command determination modules may subsequently be excluded by the monitoring module 200. No reconfiguration of command determination modules occurs during the substantiation phase. The autopilot 70 then selects a command from a non-excluded command determination module, in the manner detailed above.

After the autopilot selects a command from the non-excluded command determination modules, the monitoring system 2000 enters into a navigation phase 3, in which the autopilot controls the vehicle according to the selected command in order to implement the selected command. After the navigation phase, the control system reverts to the monitoring phase 1, in which all of the excluded command determination modules may be reconfigured.

Figure 4:
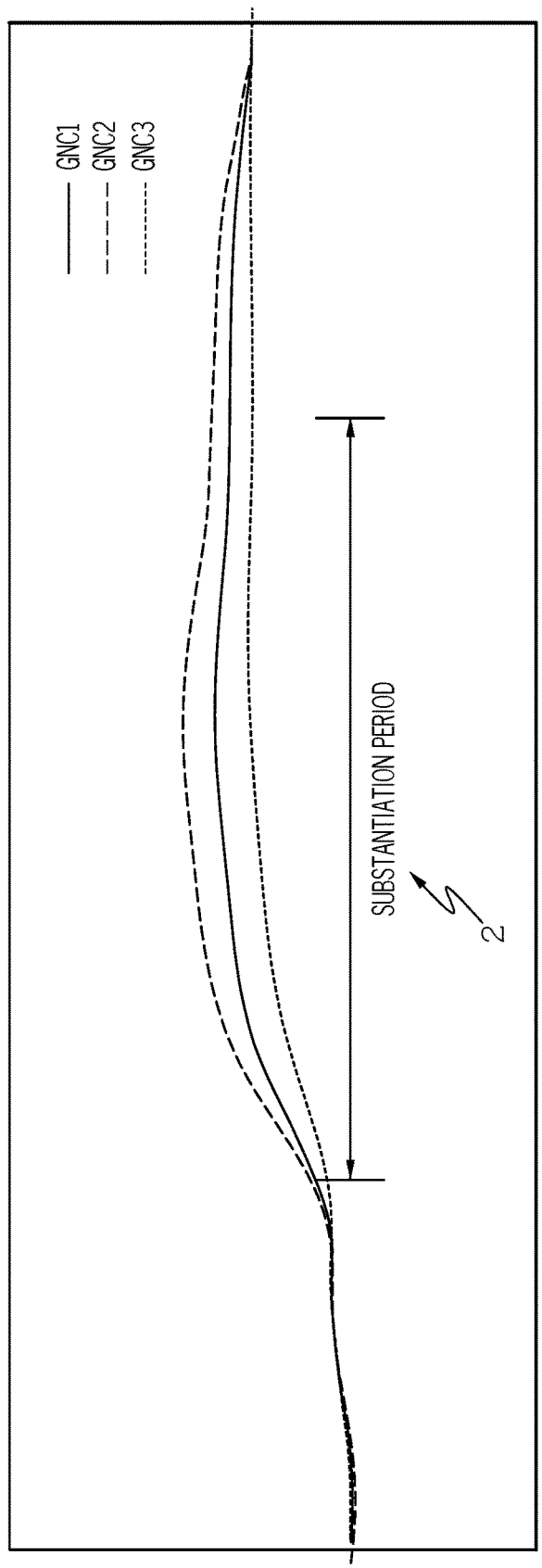
FIGS. 4 to 6 are examples of command comparisons in accordance with various embodiments.
Figure 5:
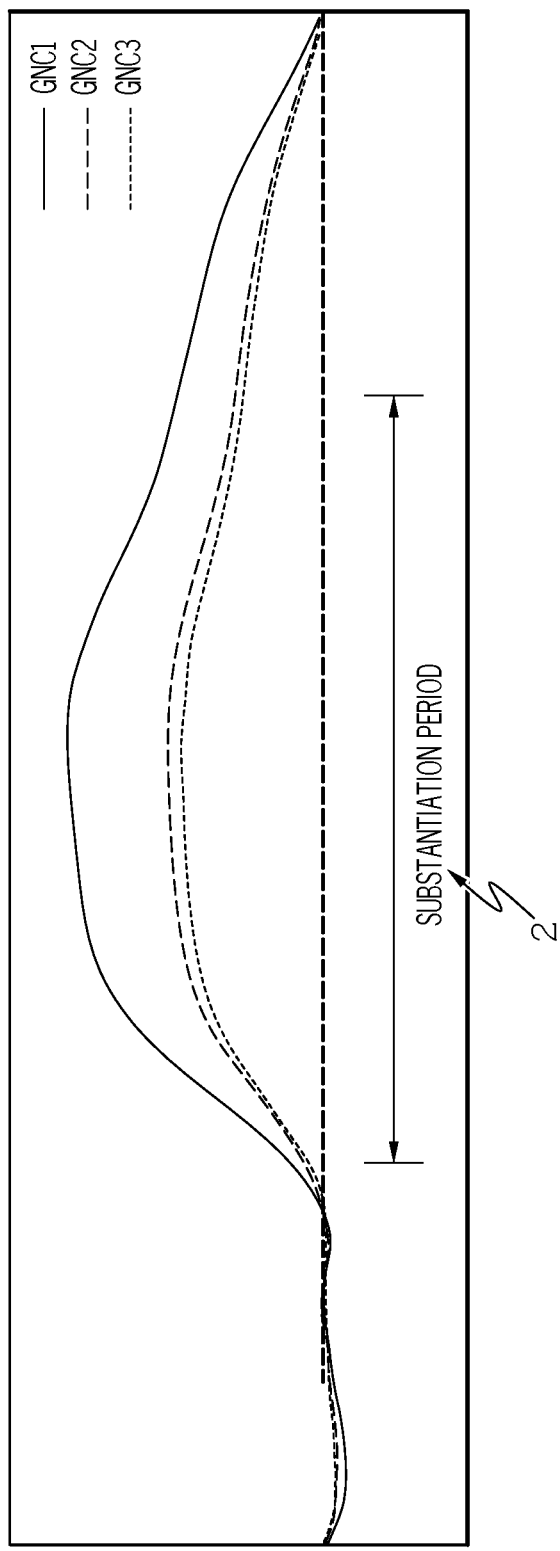
Figure 6:
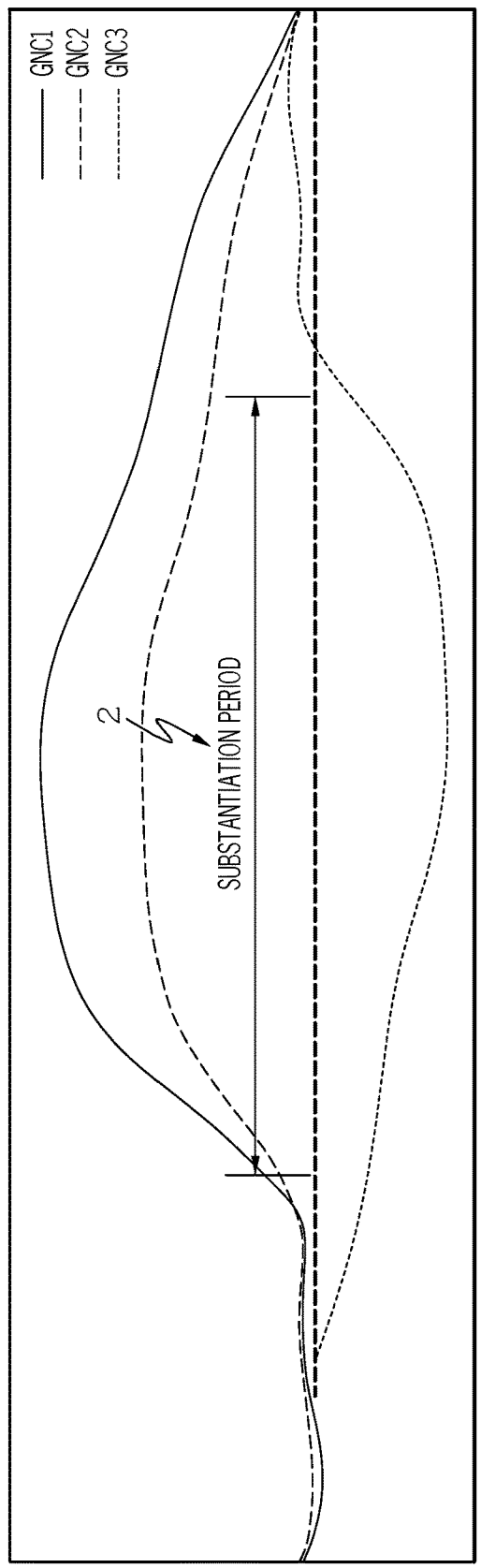

FIGS. 4 to 6 show examples of synchronized and non-synchronized commands in the substantiation phase. Each one of FIGS. 4 to 6 will now be explained in detail.

In FIG. 4, an obstacle is detected by an obstacle detection module 30, and the monitoring system consequently enters into the substantiation phase 2, which has a pre-defined substantiation time period. In this scenario, all three of the command determination modules were deemed as non-faulty during the monitoring phase, and so none of the three command determination modules were excluded in the monitoring phase.

During the substantiation phase, none of the command signals determined by any one of the three command determination modules 100 diverges from the other command signals determined by the other two command determination modules 100 by such an extent that the monitoring module would exclude any of the command determination modules. As such, none of the three of the command signals are determined as being desynchronized. The autopilot 70 selects one of the three command signals to control the vehicle.

In FIG. 5, an obstacle is detected by an obstacle detection module 30, and the monitoring system consequently enters into the substantiation phase 2. In this scenario, all three of the command determination modules were deemed as non-faulty during the monitoring phase, and so none of the three command determination modules were excluded during the monitoring phase.

During the substantiation phase, command signal GNC1 is determined by the monitoring module 200 to diverge from the other command signals GNC2 and GNC3 by such an extent as to be desynchronized, and therefore the monitoring module 200 determines that the command determination module which determined GNC1 should be excluded. The autopilot 70 then selects one of the two remaining, non-excluded command signals GNC2 and GNC3 to control the vehicle.

In FIG. 6, an obstacle is detected by an obstacle detection module 30, and the monitoring system consequently enters into the substantiation phase 2. In this scenario, all three of the command determination modules were deemed as non-faulty during the monitoring phase, and so none of the three command determination modules were excluded during the monitoring phase.

During the substantiation phase, all of the command signals GNC1, GNC2 and GNC3 are determined by the monitoring module 200 as diverging from the other command signals by such an extent to be desynchronized. As such, all of the command determination modules are excluded by the monitoring module 200. Since there is no non-excluded command determination module, the autopilot 70 alerts the driver of the vehicle that manual control of the vehicle is needed.

Figure 7:
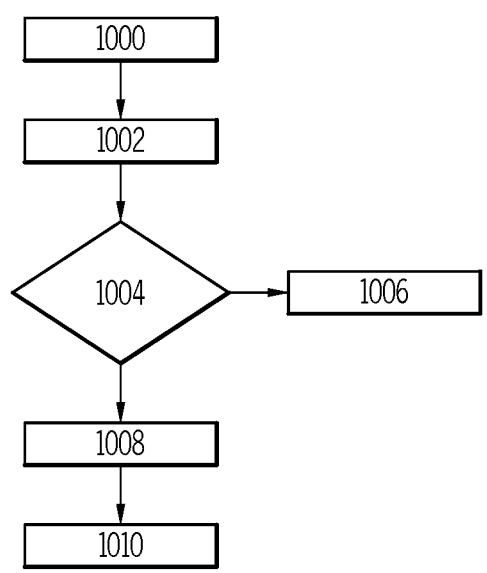
FIG. 7 is a flow chart for a method for controlling an autonomous vehicle in accordance with various embodiments.

A flowchart of the method implemented by the monitoring system 2000 in the substantiation phase is shown in FIG. 7. At step 1000, multiple GPIRS and RADAR systems generate vehicle datasets on the basis of environmental and vehicle measurements, and transmit these vehicle data-sets to respective multiple command determination modules. At step 1002, the non-excluded command determination modules determine commands on the basis of the received vehicle datasets. At step 1004, the determined commands are compared to each other to determine if any of the commands are desynchronized from the other commands. If all of the commands are desynchronized, the method proceeds to step 1006. At step 1006, autonomous vehicle control is aborted and the vehicle driver is alerted that manual control of the vehicle is needed. If at least two of the commands are synchronized, the method proceeds to step 1008. At step 1008, all command determination modules that determined desynchronized commands are excluded, and one of the synchronized commands is selected. At step 1010, the selected command is executed.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

The below statements also form part of the present disclosure.

Systems and methods are provided for executing a command in an autonomous vehicle. In one embodiment, a computer-implemented method for executing a command in an autonomous vehicle is provided. The method includes the steps of: generating at least three independent vehicle data-sets; transmitting the at least three independent vehicle data-sets to at least three command determination modules, respectively; and, at each one of the at least three command determination modules, using a respective received vehicle data-set to determine a command. The method further includes the step of, during a monitoring phase, comparing the commands to each other to determine if any one of these commands is desynchronized from the other commands. If a command is determined to be desynchronized from the other commands during the monitoring phase, the method includes the step of excluding the command determination module which determined the desynchronized command. The method further includes the step of, during a substantiation phase, comparing commands determined by non-excluded command determination modules to each other to determine if any one of these commands is desynchronized from the other commands. If a command is determined to be desynchronized from the other commands in the substantiation phase, the method includes the step of excluding the previously non-excluded command determination module which determined the desynchronized command. After the monitoring and substantiation phases are completed, the method includes the step of selecting a command determined by a non-excluded command determination module, and then executing the selected command.

In an embodiment, the substantiation phase is initiated by the detection of an obstacle.

In an embodiment, the substantiation phase is shorter in time than the monitoring period. In an embodiment, the substantiation phase is between around 0.1 seconds and around 30 seconds, for example between around 1 second to around 10 seconds, such as around 3 seconds.

In an embodiment, the method further includes the step of, if it is determined during the substantiation phase that all of the commands are desynchronized from each other, alerting an occupant of the vehicle that manual control of the vehicle is required.

In an embodiment, the method further includes the step of, during the monitoring phase, comparing the commands to a pre-determined range to determine if a value of any one of these commands is outside limits of the pre-determined range; and, if the value of a command is determined to be outside limits of the pre-determined range, excluding the command determination module which determined that command.

In an embodiment, the method further includes the step of, during the substantiation phase, comparing the commands to a pre-determined range to determine if a value of any one of these commands is outside limits of the pre-determined range; and, if the value of a command is determined to be outside limits of the pre-determined range, excluding the command determination module which determined that command.

In an embodiment, the step of selecting a command from a non-excluded command determination module comprises selecting a command from a master command determination module, unless the master command determination module is excluded.

In an embodiment, the method further includes the step of, during the monitoring phase, performing a reconfiguration process on excluded command determination modules.

In an embodiment, the at least three independent vehicle data-sets are generated on the basis of measurements obtained by at least three independent sensor systems, wherein each of the at least three independent sensor systems comprises a GPIRS and a RADAR system.

In an embodiment, there is provided a system for controlling an autonomous vehicle. The system includes at least three independent sensor sets for generating at least three independent vehicle data-sets. The system also includes at least three command determination modules, wherein each one of the at least three command determination modules is configured to receive one of the at least three independent vehicle data-sets from the at least three independent sensor sets, respectively, and each one of the at least three command determination modules is configured to determine a command on the basis of the respective received independent vehicle data-set. Each one of the at least three command determination modules comprises an obstacle detection module configured to detect an obstacle on the basis of the received vehicle data-set. The system also includes a monitoring module configured to compare the commands determined by the at least three command determination modules to each other during a monitoring phase, prior to the detection of an obstacle by one of the obstacle detection modules, and to determine if any one of these commands is desynchronized from the other commands. If the monitoring module determines that a command is desynchronized from the other commands during the monitoring phase, the monitoring module is configured to exclude the command determination module which determined the desynchronized command. The monitoring module is further configured to compare the commands determined by the non-excluded command determination modules to each other during a substantiation phase, subsequent to the detection of an obstacle by one of the obstacle detection modules, to determine if any one of these commands is desynchronized from the other commands. If the monitoring module determines that a command is desynchronized from the other commands during the substantiation phase, the monitoring module is configured to exclude the command determination module used to determine the desynchronized command. The system also includes an autopilot configured to select, after the substantiation phase, a command determined by a non-excluded command determination module and then execute the selected command.

In an embodiment, the substantiation phase is shorter in time than the monitoring period. In an embodiment, the substantiation phase is between around 0.1 seconds and around 30 seconds, for example between around 1 second to around 10 seconds, such as around 3 seconds.

In an embodiment, the monitoring module is configured to alert an occupant of the vehicle that manual control of the vehicle is required, if the monitoring module determines during the substantiation phase that all of the commands are desynchronized from the other commands.

In an embodiment, the monitoring module is further configured to, during the monitoring phase, compare the commands to a pre-determined range to determine if a value of any one of these commands is outside limits of the pre-determined range. If the monitoring module determines that the value of the command is outside limits of the pre-determined range, the monitoring module is configured to exclude the command determination module which determined that command.

In an embodiment, the monitoring module is further configured to, during the substantiation phase, compare the commands to a pre-determined range to determine if a value of any one of these commands is outside limits of the pre-determined range. If the monitoring module determines that the value of the command is outside limits of the pre-determined range, the monitoring module is configured to exclude the command determination module used to determine that command.

In an embodiment, the autopilot is configured to select the command from a master command determination module, unless the master command determination module is excluded.

In an embodiment, the monitoring module is configured to perform a reconfiguration process on excluded command determination modules during the monitoring phase.

In an embodiment, the at least three independent sensor sets each comprise GPIRS and RADAR systems.

In an embodiment, an autonomous vehicle is provided. The autonomous vehicle includes a control system which includes at least three independent sensor sets for producing at least three independent vehicle data-sets. The control system includes at least three command determination modules, wherein the at least three command determination modules are configured to receive the at least three independent vehicle data-sets from the at least three independent sensor sets, respectively, and each one of the at least three command determination modules is configured to determine a command on the basis of the respective received independent vehicle data-set. Each one of the at least three command determination modules comprises an obstacle detection module configured to detect an obstacle on the basis of the received vehicle data-set. The control system includes a monitoring module, wherein the monitoring module is configured to compare the commands determined by the at least three command determination modules to each other during a monitoring phase, prior to the detection of an obstacle by the obstacle detection module, to determine if any one of these commands is desynchronized from the other commands. If the monitoring module determines that a command is desynchronized from the other commands during the monitoring phase, the monitoring module is configured to exclude the command determination module which determined the desynchronized command. The monitoring module is also configured to compare the commands determined by non-excluded command determination modules to each other during a substantiation phase, subsequent to the detection of an obstacle by the obstacle detection module, to determine if any one of these commands is desynchronized from the other commands. If the monitoring module determines that a command is desynchronized from the other commands during the substantiation phase, the monitoring module is configured to exclude the command determination module which determined the desynchronized command. The control system also includes an autopilot system configured to select, after the substantiation phase, a command determined by a non-excluded command determination module and execute the selected command.

In an embodiment, the substantiation period is shorter in time than the monitoring period. In an embodiment, the substantiation period is between around 0.1 seconds and around 30 seconds, for example between around 1 second to around 10 seconds, such as around 3 seconds.

In an embodiment, the monitoring module is configured to alert an occupant of the vehicle that manual control of the vehicle is required, if the monitoring module determines during the substantiation phase that all of the commands are desynchronized from each other.

In an embodiment, the monitoring module is further configured to, during the monitoring phase, compare the commands to a pre-determined range to determine if a value of any one of these commands is outside limits of the pre-determined range. If the monitoring module determines that the value of the command is outside limits of the pre-determined range, the monitoring module is configured to exclude the command determination module used to determine the command.

In an embodiment, the monitoring module is further configured to, during the substantiation phase, compare the commands to a pre-determined range to determine if a value of any one of these commands is outside limits of the pre-determined range. If the monitoring module determines that the value of the command is outside limits of the pre-determined range, the monitoring module is configured to exclude the command determination module used to determine the command.

In an embodiment, the autopilot is configured to select the command from a master command determination module, unless the master command determination module is excluded.

In an embodiment, the monitoring module is configured to perform a reconfiguration process on excluded command determination modules during the monitoring phase.

In an embodiment, the at least three independent sensor sets each comprise GPIRS and RADAR systems.

What is claimed is:

1. A computer-implemented method for executing a command in an autonomous vehicle, the method comprising the steps of:
   generating at least three independent vehicle datasets;
   transmitting the at least three independent vehicle datasets to at least three command determination modules, respectively;
   at each one of the at least three command determination modules, using the respective received vehicle data-set to determine a command;
   during a monitoring phase, comparing the commands to each other to determine if any one of these commands is desynchronized from the other commands;
   if a command is determined to be desynchronized from the other commands during the monitoring phase, excluding the command determination module which determined the desynchronized command;
   during a substantiation phase, comparing commands determined by non-excluded command determination modules to each other to determine if any one of these commands is desynchronized from the other commands;
    if a command is determined to be desynchronized from the other commands in the substantiation phase, excluding the previously non-excluded command determination module which determined the desynchronized command;
after the monitoring and substantiation phases, selecting a command determined by a non-excluded command determination module; and
executing the selected command.

2. The computer-implemented method of claim 1, wherein the substantiation period is initiated when an obstacle is detected.

3. The computer-implemented method of claim 1, further comprising the step of, if it is determined during the substantiation phase that all of the commands are desynchronized from the other commands, alerting an occupant of the vehicle that manual control of the vehicle is required.

4. The computer-implemented method of claim 1, further comprising the step of, during the monitoring phase, comparing the commands to a pre-determined range to determine if a value of any one of these commands is outside limits of the pre-determined range; and
    if the value of a command is determined to be outside limits of the pre-determined range, excluding the command determination module which determined that command.

5. The computer-implemented method of claim 1, further comprising the step of, during the substantiation phase, comparing the commands to a pre-determined range to determine if a value of any one of these commands is outside limits of the pre-determined range; and
    if the value of a command is determined to be outside limits of the pre-determined range, excluding the command determination module which determined that command.

6. The computer-implemented method of claim 1, wherein the step of selecting a command from a non-excluded command determination module comprises selecting a command from a master command determination module, unless the master command determination module is excluded.

7. The computer-implemented method of claim 1, further comprising the step of, during the monitoring phase, performing a reconfiguration process on excluded command determination modules.

8. The computer-implemented method of claim 1, wherein the at least three independent vehicle data-sets are generated on the basis of measurements obtained by at least three independent sensor systems, each of the at least three independent sensor systems comprising a GPIRS and a RADAR system.

9. A system for controlling an autonomous vehicle, the system comprising:
    at least three independent sensor sets for generating at least three independent vehicle data-sets;
    at least three command determination modules, wherein each one of the at least three command determination modules is configured to receive one of the at least three independent vehicle data-sets from the at least three independent sensor sets, respectively, and each one of the at least three command determination modules is configured to determine a command on the basis of the respective received independent vehicle dataset, and wherein each one of the at least three command determination modules comprises an obstacle detection module configured to detect an obstacle on the basis of the received vehicle data-set;
    a monitoring module configured to compare the commands determined by the at least three command determination modules to each other during a monitoring phase, prior to the detection of an obstacle by one of the obstacle detection modules, to determine if any one of these commands is desynchronized from the other commands, wherein if the monitoring module determines that a command is desynchronized from the other commands during the monitoring phase, the monitoring module is configured to exclude the command determination module which determined the desynchronized command, and wherein the monitoring module is further configured to compare the commands determined by the non-excluded command determination modules to each other during a substantiation phase, subsequent to the detection of an obstacle by one of the obstacle detection modules, to determine if any one of these commands is desynchronized from the other commands, wherein if the monitoring module determines that a command is desynchronized from the other commands during the monitoring phase, the monitoring module is configured to exclude the command determination module which determined the desynchronized command; and
    an autopilot configured to select, after the substantiation phase, a command determined by a non-excluded command determination module and execute the selected command.

10. The system of claim 9, wherein the substantiation period is around 0.1 to 30 seconds seconds.

11. The system of claim 9, wherein the monitoring module is configured to alert an occupant of the vehicle that manual control of the vehicle is required, if the monitoring module determines during the substantiation phase that all of the commands are desynchronized from the other commands.

12. The system of claim 9, wherein the monitoring module is further configured to, during the monitoring phase, compare the commands to a pre-determined range to determine if a value of any one of these commands is outside limits of the pre-determined range; and if the monitoring module determines that the value of the command is outside limits of the pre-determined range, excluding the command determination module which determined the command.

13. The system of claim 9, wherein the monitoring module is further configured to, during the substantiation phase, compare the commands to a pre-determined range to determine if a value of any one of these commands is outside limits of the pre-determined range; and if the monitoring module determines that the value of the command is outside limits of the pre-determined range, excluding the command determination module which determined the command.

14. The system of claim 9, wherein the autopilot is configured to select the command from a master command determination module, unless the master command determination module is excluded.

15. The system of claim 9, wherein the monitoring module is configured to perform a reconfiguration process on excluded command determination modules during the monitoring phase.

16. The system of claim 9, wherein the at least three independent sensor sets each comprise GPIRS and RADAR systems.

17. An autonomous vehicle, the autonomous vehicle including a control system comprising:

at least three independent sensor sets for producing at least three independent vehicle data-sets;

at least three command determination modules, wherein the at least three command determination modules are configured to receive the at least three independent vehicle data-sets from the at least three independent sensor sets, respectively, and each one of the at least three command determination modules is configured to determine a command on the basis of the respective received independent vehicle data-set, and wherein each one of the at least three command determination modules comprises an obstacle detection module configured to detect an obstacle on the basis of the received vehicle data-set;

a monitoring module, wherein the monitoring module is configured to compare the commands determined by the at least three command determination modules to each other during a monitoring phase, prior to the detection of an obstacle by the obstacle detection module, to determine if any one of these commands is desynchronized from the other commands, wherein if the monitoring module determines that a command is desynchronized from the other commands during the monitoring phase, the monitoring module is configured to exclude the command determination module which determined the desynchronized command; and wherein the monitoring module is also configured to compare the commands determined by non-excluded command determination modules to each other during a substantiation phase, subsequent to the detection of an obstacle by the obstacle detection module, to determine if any one of these commands is desynchronized from the other commands, wherein if the monitoring module determines that a command is desynchronized from the other commands during the monitoring phase, the monitoring module is configured to exclude the command determination module which determined the desynchronized command; and an autopilot system configured to select, after the substantiation phase, a command determined by a non-excluded command determination module and execute the selected command.

18. The vehicle of claim 17, wherein the substantiation period is around 0.1 to 30 seconds.

19. The vehicle of claim 17, wherein the monitoring module is further configured to, during the substantiation phase, compare the commands to a pre-determined range to determine if a value of any one of these commands is outside limits of the pre-determined range; and if the monitoring module determines that the value of the command is outside limits of the pre-determined range, excluding the command determination module which determined the command.

20. The vehicle of claim 17, wherein the autopilot is configured to select the command from a master command determination module, unless the master command determination module is excluded.

* * * * *